(No Model.)
J. B. HAIGHT.
CYLINDER COCK FOR ENGINES.
No. 279,562. Patented June 19, 1883.
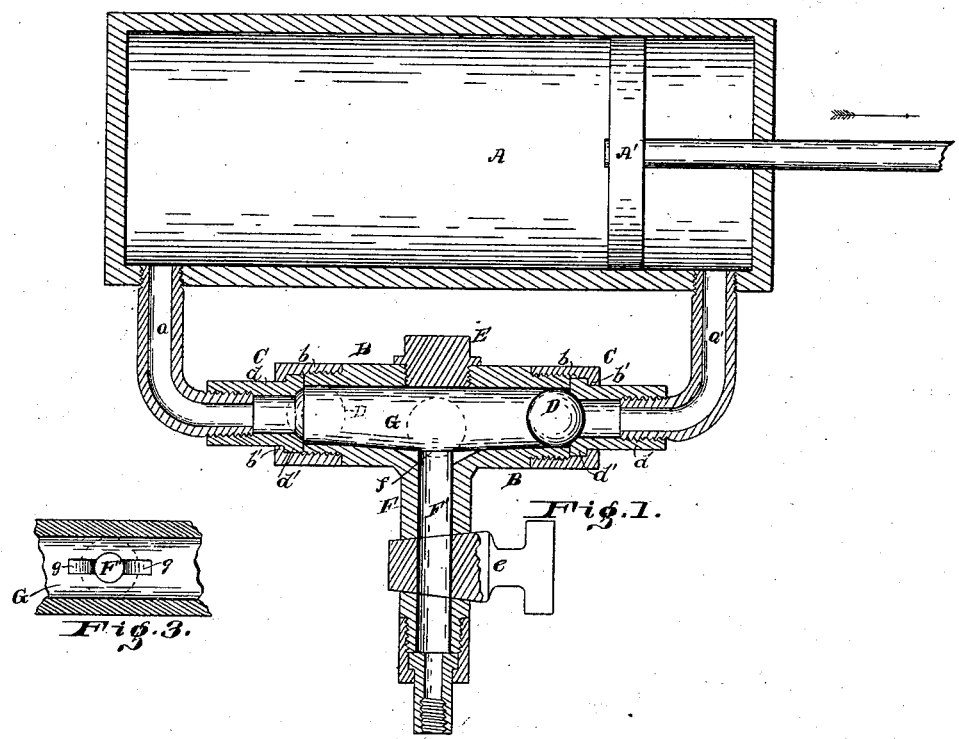
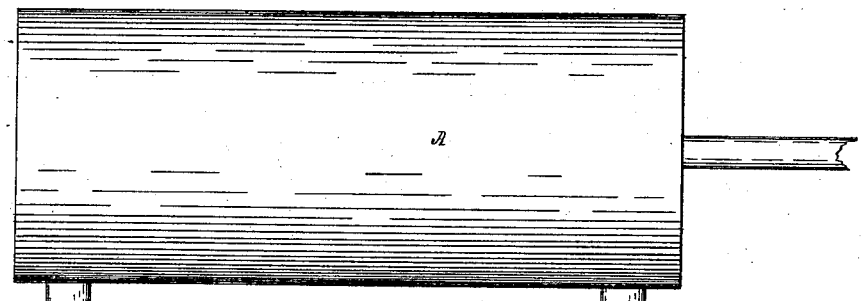
Attest:
E. R. Hill
K. P. Gulick
Inventor:
John B. Haight
per Wm. Hubbell Fisher,
Atty

UNITED STATES PATENT OFFICE.

JOHN B. HAIGHT, OF CINCINNATI, OHIO.

CYLINDER-COCK FOR ENGINES.

SPECIFICATION forming part of Letters Patent No. 279,562, dated June 19, 1883.

Application filed November 2, 1882. (No model.)

*To all whom it may concern:*

Be it known that I, JOHN B. HAIGHT, of the city of Cincinnati, county of Hamilton, and State of Ohio, have invented certain new and useful Improvements in Cylinder-Cocks for Engines, of which the following is a specification.

The object of my invention is to provide new, simple, and efficient means for permitting the escape of water caused by the condensation of steam in the cylinders of steam-engines.

My invention, its several features, and the advantages connected therewith will be apparent from the following specification.

Referring to the drawings forming part of this specification, Figure 1 is a vertical longitudinal section through the center of a cylinder with my invention attached thereto. Fig. 2 is an elevation of the same.

A represents the cylinder of a double-acting engine, in which is located and operates the piston A'; and Fig. 3 represents a top view of the central portion of the lower side of the valve-chamber, illustrating the preferred form of construction for securing an outlet simultaneously from both ends of the cylinder of any water that may be in the cylinder when the engine is not running.
This cylinder and piston may be of any desired form of construction now in use on locomotives or stationary engines.

To the bottom of the cylinder are connected the small pipes $a$ $a'$—one at one end of the cylinder and the other at the other end of same—and these pipes communicate with the interior of the cylinder, and the free ends of these pipes each communicate with the valve-box B, to the opposite ends of which they are respectively connected by suitable couplings. In the present instance they are connected to the valve-box by "union" couplings C, each coupling consisting of a nut, $b$, provided with an inwardly-projecting flange, $b'$, and a short tube, $d$, having a surrounding flange, $d'$. The free ends of the pipes $a$ $a'$ being screwed into the short tubes $d$, the ends of these tubes are placed against the opposite ends of the valve-box B, and the nuts $b$ are then screwed onto the ends of the box until the flanges $b'$ of the nut press against the flanges $d'$ of the tubes $d$, holding them tightly against the ends of the valve-box, thus connecting the pipes $a$ $a'$ to said valve-box. The chamber of the valve-box B is tubular, and within this chamber is located a ball-valve, D, free to play from one end of the chamber to the other, where it strikes against the ends of the tubes $d$, which are adapted to form valve-seats for the valve. The top of the valve-box B is preferably provided with a screw-plug, E, the opening which the latter fills being of a size to permit of the removal or insertion of the ball D, enabling it to be readily replaced when worn so as to become imperfect. This valve-box B is provided with an outlet tube or nozzle, F, through which the water escapes, and this nozzle is provided with a stop-cock, $e$, to govern the flow of water or steam through the nozzle.

When my invention is used in connection with a locomotive, the water escapes from the nozzle and falls directly to the ground; but when used on a stationary engine it is desirable to convey the water farther away from the cylinder, and for this purpose a pipe may be connected to the end of the nozzle by means of a suitable connection, preferably a union-connection similar to that described, and conveyed to the place desired. In the drawings this union-connection is shown attached to the end of the nozzle. When used on a locomotive the cock $e$ is connected to a system of levers by which it may be operated from the cab by the engineer.

When the cylinder is cool, much of the steam admitted to it will be condensed, and water of condensation accumulates to such an extent that a necessity arises for removing it from the cylinder by some conduit other than the ordinary steam-escape pipe. To meet this necessity the cock $e$ is opened, and the operation of my invention as above described is as follows: If the engine is running very slow, or if it has been stopped, more or less water of condensation is formed in the cylinder, and should be removed, in order that every portion of the interior of the cylinder may be occupied by steam. When the engine is started, the cock $e$ is opened, and the live steam in one end of the cylinder will throw the ball D toward the opposite end, and the water which has been condensed in this end of the cylinder where the live steam is will be forced out through the nozzle F. For instance, supposing the end of the cylinder which is at the left hand in Fig. 1 to be the end occupied by the live steam, the other end being exhausting, the piston A' will be forced to the right, and the steam entering the pipe $a$ will press against the ball D, carrying it also to the right-hand end of the valve-box, where it fits against the valve-seat formed in the end of the tube $d$, preventing the passage of any steam or water in this direction, and therefore the water which has been condensed in the left-hand end of the cylinder will be forced by the pressure of the steam out through the pipe $a$ and nozzle F. As soon as the valve of the engine reverses, so as to throw the live steam into the right-hand end of the cylinder, the pressure of this live steam throws the piston A' and the ball D toward the left, and forces the water from this end of the cylinder out through the pipe $a'$ and the nozzle F, and this reverse motion of the valve D is repeated at every movement of the piston until all of the water has been removed from the cylinder, when, if desired, the cock $e$ may be closed; but I prefer to leave the cock partly open, as no accumulation of water in the cylinder will be allowed while the engine is running.

It is desirable that, when the engine is not running, an outlet from each end of the cylinder should be simultaneously kept open to admit of the escape of any water that may be present in the cylinder. A preferred mode of construction to accomplish this object consists as follows: The bottom of the valve-chamber G inclines from each end down toward the outlet. For this reason the ball-valve D, when the engine is not running, will, from its inherent gravity, roll to the lowest point in the chamber, which point is preferably over the inlet $f$ of pipe F'. While the ball is over this inlet $f$, (see Figs. 1 and 3,) the water coming through the outlets or pipes $a'$ into the valve-chamber G finds a way of egress into the pipe F' through the channels or orifices $g$, located at the side of the main-conduit outlet F of the cock, communicating with the latter even when the ball-valve is over the mouth of conduit F'. As the ball-valve is prevented from sinking into or covering these orifices $g$ by means of the remaining portions of the top edges of the main conduit F', these orifices are always open to the outflow of water in the valve-chamber G. When desired the position of these orifices may be varied from that herein shown. They may be placed farther to the right and left of the main pipe F', and the upper edge of the main pipe F' be left perfect. Another mode of arranging such conduit-connections between the main pipe F' and the valve-chamber G is to enlarge the entire upper portion of pipe F' and place a perforated web or gauze thereon, larger than that portion of the bottom of the ball which rests thereon. Other modes of forming and arranging these connections will suggest themselves under this feature of my invention, which consists in such construction of the conduits $g$ that while the engine is stopped and the ball-valve is away from the seats of the valve-chamber G free communication between each end of the cylinder and the pipe F' shall be established.

As before stated, my invention may be applied either to stationary engines or locomotive-engines, and in either the operation will be equally effective.

Having thus described my invention, what I claim as new, and desire to secure by Letters Patent, is as follows:

1. The valve-chamber provided at each end with a circular valve-seat facing the chamber and communicating with its respective end of the cylinder, and the said chamber having a central discharge-orifice and conduit suitably opened or closed, and a ball-valve within said chamber, capable of being placed on one or the other of said seats as driven by the action of the steam in the cylinder, substantially as and for the purposes specified.

2. The valve-box B, provided with a single ball-valve, D, and having a valve-seat at each end, and a single outlet, F, having a cock, $e$, in combination with the cylinder of a steam-engine, the valve-box being connected to said cylinder by the pipes $a\ a'$, communicating with the interior of the cylinder at or near the ends of the latter, substantially as and for the purposes specified.

3. The valve-box consisting of the body B, having a tubular interior provided with a valve-seat at each end, and having a ball-valve, D, the body being further provided with a screw-plug, E, and nozzle F, having a cock, $e$, substantially as and for the purposes specified.

4. The combination of the valve-chamber G, connected to the cylinder by the conduits $a''$, and provided with valve-seats, ball-valve D, located between said seats, the egress-conduit F', and egress-orifices $g$ for establishing communication between the valve-chamber and the conduit F' when the valve is over the latter conduit, substantially as and for the purposes specified.

5. In a cylinder-cock, the valve-chamber having the ball-valve located therein and playing between the valve-seats of said chamber, the valve-chamber having a bottom inclined down to the centrally-located exit-conduit F', in combination with the egress-orifices $g$ for establishing communication between the valve-chamber and the exit-conduit F' independently of the inlet-mouth $f$, of conduit F', substantially as and for the purposes specified.

JOHN B. HAIGHT.

Attest:
  WM. E. JONES,
  E. R. HILL.